United States Patent

Mafoti et al.

Patent Number: 5,473,044
Date of Patent: Dec. 5, 1995

[54] HDI RESIDUE IN REACTION INJECTION MOLDING

[75] Inventors: Robson Mafoti, Pittsburgh; David D. Steppan, Gibsonia, both of Pa.

[73] Assignee: Bayer Corporation, Pittsburgh, Pa.

[21] Appl. No.: 426,359

[22] Filed: Apr. 21, 1995

[51] Int. Cl.$^6$ .............. C08G 18/02; C08G 18/06
[52] U.S. Cl. ............... 528/67; 528/52; 528/55
[58] Field of Search ................ 528/67, 52, 55

[56] References Cited

U.S. PATENT DOCUMENTS

| | | | |
|---|---|---|---|
| 4,048,102 | 9/1977 | Quock et al. | 260/2.5 AM |
| 4,218,543 | 8/1980 | Weber et al. | 521/51 |
| 4,269,945 | 5/1981 | Vanderhider et al. | 521/159 |
| 4,642,320 | 2/1987 | Turner et al. | 521/176 |
| 4,764,543 | 8/1988 | Savina | 521/160 |
| 4,772,639 | 9/1988 | Pilger et al. | 521/124 |
| 4,937,366 | 6/1990 | Nodelman | 521/163 |
| 5,158,607 | 10/1992 | Mafoti et al. | 106/243 |
| 5,260,346 | 11/1993 | Cassidy et al. | 521/159 |

OTHER PUBLICATIONS

E. P. Squiller and J. Rosthauser entitled "Catalysis in Aliphatic Isocyanate–Alcohol Reactions", Modern Paint and Coating Jun. 1987.

J. W. Britain and P. G. Gemeinhartdt entitled "Catalysis of the Isocyanate–Hydorxyl Reaction", American Chemical Society, 137th meeting Cleveland, Ohio Apr. 1960.

*Primary Examiner*—Morton Foelak
*Attorney, Agent, or Firm*—Joseph C. Gil; N. Denise Brown

[57] ABSTRACT

This invention relates to a process for the production of a polyurethane molded part from a reaction injection molding process. The reaction mixture comprises:

A) an isocyanate distillation residue resulting from the production of 1,6-hexamethylenediisocyanate by phosgenation of the corresponding amine, followed by the distillation of the pure 1,6-hexamethylenediisocyanate to yield said residue, wherein said residue has an NCO content of from 20 to 27%, a viscosity of from 1500 to 5000 cps at 25° C., and from 0.1 to 3% by weight of hydrolyzable chlorides; with B) an isocyanate-reactive component comprising at least one organic compound having a molecular weight of from 500 to 10,000 and containing at least two isocyanate-reactive hydroxyl groups, and at least one organic diol having a molecular weight of from about 62 to 500, in the presence of C) a specific catalyst mixture.

The catalyst comprises at least one tertiary amine catalyst in combination with another catalyst selected from the group consisting of metal carboxylates, metal halides, ammonium carboxylates, and mixtures thereof.

4 Claims, No Drawings

HDI RESIDUE IN REACTION INJECTION MOLDING

BACKGROUND OF THE INVENTION

The present invention relates to a process for the production of polyurethane moldings from a reaction mixture via the RIM process.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates, such as, for example, diphenyl methane-4,4'-diisocyanate (i.e. MDI).

Various patents such as, for example, U.S. Pat. No. 4,937,366, broadly disclose aliphatic isocyanates in a long list of isocyanates which are said to be suitable for use in a RIM process. However, very few of the patents which disclose that aliphatic isocyanates are suitable for use in a RIM process have any working examples wherein an aliphatic isocyanate is used. The RIM examples of U.S. Pat. No. 4,937,366 are all based on a prepolymer of an aromatic isocyanate.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanato-hexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. However, the reference requires unusually long demold times, i.e. from 3–10 minutes.

IPDI has NCO groups of differing reactivity due to stearic hindrances. The first NCO group reacts much more quickly than the second NCO group. This fact requires higher mold temperatures and/or longer demold times for RIM systems based on IPDI.

In addition, U.S. Pat. No. 4,772,639 clearly requires that at least 10% by weight of the IPDI monomer be used. This is not attractive from a physiological viewpoint.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) an aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. The isocyanate used in the examples contains at least 39% by weight of HDI monomer. Although the reference discloses aliphatic isocyanates are suitable for this process, the mold temperatures are higher than normal, i.e. at least 90° C., and the demold times range from about 1–5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers. Catalysts are not required for these RIM systems. All of the working examples of this patent use methylene bis(4-cyclohexylisocyanate) which is difunctional, and 100% monomer.

The present invention is directed to a method of obtaining fast reacting RIM systems based on HDI residue with OH terminated soft segments and extenders and aminoalcohol extenders in the presence of a special catalyst package. An advantage of the presently claimed systems over total polyurea systems is their improved flow characteristics during mold filling.

RIM systems are also disclosed in U.S. Pat. No. 4,269,945. These systems are based on compositions comprising a polyisocyanate (preferably aromatic), a polyol, and a specific chain extender. The specific chain extender comprises (1) at least one component selected from the group consisting of (a) a hydroxyl-containing material which is essentially free of aliphatic amine hydrogen atoms, and (b) aromatic amine-containing materials containing at least two aromatic amine hydrogen atoms and are essentially free of aliphatic amine hydrogen atoms; and (2) at least one aliphatic amine-containing material having at least one primary amine group and an average aliphatic amine hydrogen functionality of from about 2 to 16. All of the working examples in this patent use aromatic isocyanates that may be polymeric in nature. No specific catalyst is required for these systems. Demold times of 60 seconds are disclosed for the examples even though comparatively faster reacting aromatic isocyanates are used.

Generally, it is known that tertiary amines which are typical urethane catalysts are not effective when working with aliphatic polyisocyanates. This is discussed in several references, including, for example, the article by E. P. Squiller and J. Rosthauser entitled "Catalysis in Aliphatic Isocyanate-Alcohol Reactions", Modern Paint and Coatings, June 1987; and the article by J. W. Britain and P. G. Gemeinhardt entitled "Catalysis of the Isocyanate-Hydroxyl Reaction", American Chemical Society, 137th meeting, Cleveland, Ohio, April 1960.

1,6-Hexamethylene diisocyanate (HDI) residue contains from 0.1 to 3% by weight of hydrolyzable chlorides. The presence of these chlorides makes it difficult to process this material. Since these chlorides destroy typical urethane metal catalysts, it is hard to achieve reasonable gel times. The use of catalysts which include tertiary amines has been found to alleviate this problem as tertiary amines render the hydrolyzable chlorides inactive by forming quaternary salts.

SUMMARY OF THE INVENTION

This invention relates to a process for the production of a polyurethane molded part from a reaction injection molding process comprising introducing a reaction mixture into a closed mold, allowing the reaction components to fully react, and removing the molded part from the mold. The reaction mixture comprises:

A) an isocyanate distillation residue resulting from the production of 1,6-hexamethylenediisocyanate by phosgenation of the corresponding amine, followed by the distillation of the pure 1,6-hexamethylenediisocyanate to yield said residue, wherein said residue consists essentially of 25 to 40% by weight of HDI dimer, 8 to 15% by weight of HDI trimer, 9 to 14% by weight of polymeric HDI, no more than 1% by weight of monomeric HDI, and the balance being by-products of the phosgenation process; wherein said residue has an NCO content of from 20 to 27%, a viscosity of from 1500 to 5000 cps at 25° C., and contains from 0.1 to 3% by weight of hydrolyzable chlorides;

with

B) an isocyanate-reactive component comprising:
   b1) from about 42 to 95%, preferably 55 to 75% by weight, based on the total weight of component B) and component C), of at least one organic compound having a molecular weight of from 500 to 10,000, and containing at least two isocyanate-reactive hydroxyl groups,
   b2) from about 5 to 30%, preferably 5 to 20% by weight, based on the total weight of component B) and component C), of at least one organic diol having a molecular weight of from about 62 to 500, and
   b3) from about 0 to 20%, preferably 2 to 10% by weight, based on the total weight of component B) and component C), of at least one aminoalcohol having a molecular weight of from about 61 to 500, in the presence of C) from 0.2 to 8%, preferably 1 to 4% by weight, based on the total weight of component B) and component C), of a catalyst mixture comprising:
   c1) from 0.1 to 5%, preferably 0.9 to 3% by weight, based on the total weight of component B) and component C), of at least one catalyst selected from the group consisting of metal carboxylates, metal halides, ammonium carboxylates, and mixtures thereof, and c2) from at least 0.1 to 3%, preferably 0.1 to 1% by weight, based on the total weight of component B) and component C), of at least one tertiary amine catalyst;

wherein the isocyanate index of this reaction mixture is from 95 to 120, preferably from 100 to 110.

The embodiment wherein the reaction mixture additionally comprises antioxidants and/or UV stabilizers has been found to have special advantages for certain uses of these molded products. These elastomers have enhanced weathering performance which is advantageous for unpainted outdoor applications.

It has been found that this particular combination of materials gives excellent processing on RIM equipment, and results in molded parts having short demold times with excellent greenstrength and good final tear properties. This is very surprising since the demold times were 30 seconds, which is typical of fast reacting systems based on aromatic isocyanates and not thought to be attainable with systems based on aliphatic isocyanates, let alone isocyanates containing hydrolyzable chlorides like HDI residue, in conjunction with glycol and/or aminoalcohol chain extenders.

In accordance with the present invention, the isocyanate component is an isocyanate distillation residue resulting from the production of 1,6-hexamethylenediisocyanate by phosgenation of the corresponding amine. The pure 1,6-hexamethylenediisocyanate is removed by distillation to yield residue. This residue consists essentially of 25 to 40% by weight of HDI dimer, 8 to 15% by weight of HDI trimer, 9 to 14% by weight of polymeric HDI, no more than 1% by weight of monomeric HDI, and the balance being by-products of the phosgenation process; wherein said residue has an NCO content of from 20 to 27%, a viscosity of from 1500 to 5000 cps at 25° C., and contains from 0.1 to 3% by weight of hydrolyzable chlorides.

Also necessary for preparing molded products via the RIM process is an isocyanate reactive component, i.e. component B). According to the present invention, component B) comprises b1) at least one high molecular weight compound containing at least about two, and preferably from about two to three isocyanate-reactive hydroxyl groups, b2) at least one low molecular weight organic diol, and b3) at least one aminoalcohol.

Component b1) comprises at least one organic compound having a molecular weight of from 500 to 10,000 and containing at least about two isocyanate-reactive hydroxy groups. Examples of some suitable compounds to be used as component b1) include, for example, the polyethers, polyesters, polythioethers, polyacetals, and polycarbonates containing from about 2 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component b1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms.

The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

In another embodiment, the polyhydroxyl compound b1) may additionally comprise: i) a dispersion of a polyurea and/or polyhydrazodicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and amino-functional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550, 796, 2,550,797, 2,550,833, 2,550,862, 2,633,293, and 2,639, 254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Miles Inc. and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene, acrylonitrile, or both in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Arco.

The preferred PHD polyols include the polyurea of toluene diisocyanate and hydrazine dispersed in polyether polyol, and the preferred polymer polyols include those based on the monomers styrene and acrylonitrile.

The isocyanate-reactive component B) additionally comprises component b2) a low molecular weight organic compound having a molecular weight of from about 62 to 500.

Suitable organic diols to be used as component b2) according to the invention include, for example, diols having a molecular weight of about 62 to 500, preferably about 62 to 400. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, dipropylene glycol, tripropylene glycol, neopentyl glycol, cyclohexanedimethanol, 2,2,4-trimethylpentane-1,3-diol, and mixtures thereof.

Preferred compounds for use as component b2) are 1,4-butanediol and 2-methyl-1,3-propanediol.

In addition, the isocyanate-reactive component B) also includes b3) organic amino alcohols having molecular weights of about 61 to 500, preferably about 61 to 400. Some examples of these compounds include monoethanolamine, monoisopropanolamine, mixtures thereof, and the like.

The preferred compound for use as component b3) is monoethanolamine.

The process of the invention also requires a combination of catalysts to catalyze the reaction between the isocyanate groups of A) and the isocyanate-reactive groups of B), and to neutralize the hydrolyzable chlorides in the isocyanate distillation residue. It is preferred that the combination of catalysts is optimized both in terms of quantity and chemical composition so as to achieve a short demold time in the process. The catalyst C) comprises c1) at least one catalyst selected from the group consisting of metal carboxylates, metal halides, ammonium carboxylates, and mixtures thereof, and c2) at least one tertiary amine catalyst. Of the metal halides, the metal chlorides are preferred.

Some examples of catalysts suitable for use as c1) catalysts include metal carboxylates including, for example, tin carboxylates such as, for example, dimethyltin dilaurate, dibutyltin dilaurate and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e. Dabco TMR). Tin carboxylates such as dimethyltin dilaurate, and bismuth carboxylates such as bismuth trineodecanoate are preferred catalysts to be used as component c1).

Suitable catalysts to be used as tertiary amine catalysts c2) include, for example, triethylamine, triethylenediamine, tributylamine, N-methylmorpholine, N-ethylmorpholine, triethanolamine, triisopropanolamine, N-methyldiethanolamine, N-ethyldiethanolamine, N,N-dimethylethanolamine, pentamethyl diethylene triamine, bis(dimethylaminopropyl)methylamine, bis(dimethylaminopropyl)ethylamine, and bis(dimethylaminopropyl)propylamine. A preferred catalyst c2) is bis(dimethylaminopropyl)methylamine.

Other additives which may be used in the RIM process according to the present invention include surface-active additives such as emulsifiers and foam stabilizers. Examples include N-stearyl-N',N'-bishydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable anti-oxidants include, for example, Irganox 245, and suitable UV stabilizers include, for example, Tinuvin 765. However, any of the known anti-oxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 95 to 120 (preferably from 100 to 110). The term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains the isocyanate reactive components and any other additives which are to be included.

The invention is further illustrated but is not intended to be limited by the following examples in which all parts and percentages are by weight unless otherwise specified.

EXAMPLES

A B-side mixture was prepared by blending the various components in the appropriate quantity as shown in the Tables set forth hereinbelow, and thoroughly mixed. They were put into the B-side of a Hennecke RIMDOMAT RIM machine. The appropriate quantity of Isocyanate to achieve an isocyanate index of 105 was loaded into the A-side. The RIMDOMAT was equipped with a Hennecke MQ 8 Mixhead. The B-side was preheated to 65° C. and the A-side was heated to 55° to 65° C. The materials were injected at a 105 isocyanate index at an injection pressure of 200 bar and an injection rate of 200 grams/sec. The material was injected into a flat plaque mold of 3×200×300 mm heated to 65° C., and sprayed with Chemtrend RCTW 2006 mold release spray. After a 60 second dwell time, the part was demolded. Physical properties were determined in accordance with ASTM standards. Other RIM examples were performed in a similar manner, except for the pbw of various components.

| | |
|---|---|
| D790 | flexural modulus |
| D412 | tensile strength; and elongation |
| D624 | die C tear strength |

The following components were used in the Examples.

Polyol A: a polytetramethylene diol having an OH number of 56

Polyol B: ethylenediamine-started polyether of propylene oxide having a functionality of 4 and a hydroxyl number of 630

MEOA: monoethanolamine

Diol A: 1,4-butanediol

Diol B: 2-methyl-1,3-propanediol

Catalyst A: Fomrez UL-28, dimethyltin dilaurate (commercially available from Witco Corp.)

Catalyst B: bis(dimethylaminopropyl)methyl amine (commercially available from Air Products as Polycat 77)

Isocyanate A: an isocyanate distillation residue that consisted essentially of 37% by weight of HDI dimer, 13% by weight of HDI trimer, 12% by weight of polymeric HDI, no more than 1% by weight of monomeric HDI, and the balance being by-products of the phosgenation process. This residue had an NCO content of 26.5%, a viscosity of 1500 cps at 25° C., and contained about 2% hydrolyzable chlorides. It was prepared from the production of 1,6-hexamethylene-diisocyanate by phosgenation of the corresponding amine, followed by the distillation of the pure 1,6-hexamethylenediisocyanate to yield the residue.

Examples 1–2 which are representative of the invention, use a catalyst package containing tertiary amines. Examples 3 and 4 are comparative and use a standard catalyst package that does not contain tertiary amines. As shown in the table, examples 3 and 4 could not be processed by the RIM technique. The product was cheesy and brittle, indicating poor reactivity.

Examples 1 and 2 processed normally by the RIM technique due to the use of a catalyst package containing a tertiary amine. This tertiary amine gives systems based on HDI residue suitable reactivity, and enables these systems to be processed via RIM to yield a product which is commercially viable as evidenced by the physical properties.

| Example | 1 | 2 | 3 | 4 |
|---|---|---|---|---|
| Polyol Side: | | | | |
| Diol A | | 22 | | 22 |
| Diol B | 22 | | 22 | |
| Polyol A | 71.5 | 71.5 | 71.5 | 71.5 |
| Polyol B | | | | |
| MEOA | 4 | 4 | 4 | 4 |
| Catalyst A | 2 | 2 | 2 | 2 |
| Catalyst B | 0.5 | 0.5 | 0 | 0 |
| Isocyanate: | Iso A | Iso A | Iso A | Iso A |
| NCO % | 26.5 | 26.5 | 26.5 | 26.5 |
| NCO/OH Index | 105 | 105 | 105 | 105 |
| Processing: | | | | |
| Demold Time | 60 | 60 | 60 | 60 |
| Isocyanate Temp. D | 60 | 60 | 60 | 60 |
| Mold Temperature C | 65 | 65 | 65 | 65 |
| Polyol Temperature C | 50 | 50 | 50 | 50 |
| Observations: | | | | |

-continued

| Example | 1 | 2 | 3 | 4 |
|---|---|---|---|---|
| Mixing | Exc | Exc | Good | Good |
| Green Strength | Good | Good | Poor | Poor |
| Processing | Exc | Exc | Poor | Poor |
| Reactivity | Normal | Normal | Very Slow | Very Slow |
| Tear | Exc | Good | Poor | Poor |
| Phys. Properties: | | | | |
| RT Flexural (psi) | 50,000 | 2,400 | | |
| Elongation (%) | 40 | 120 | | |
| Tensile Strength (psi) | 2470 | 1600 | | |
| Tear Strength (pli) | 425 | 220 | | |

Physical properties could not be determined for Examples 3 and 4 as the material was cheesy and brittle.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane molded part from a reaction injection molding process comprising introducing a reaction mixture into a closed mold wherein said reaction mixture comprises:

A) an isocyanate distillation residue resulting from the production of 1,6-hexamethylenediisocyanate by phosgenation of the corresponding amine, followed by the distillation of the pure 1,6-hexamethylenediisocyanate to yield said residue, wherein said residue consists essentially of 25 to 40% by weight of HDI dimer, 8 to 15% by weight of HDI trimer, 9–14% by weight of polymeric HDI, no more than 1% by weight of monomeric HDI, and the balance being by-products of the phosgenation process; wherein said residue has an NCO content of from 20 to 27%, a viscosity of from 1500 to 5000 cps at 25° C., and from 0.1 to 3% by weight of hydrolyzable chlorides;

with

B) an isocyanate-reactive component comprising:

b1) from about 42 to 95% by weight, based on the total weight of component B) and component C), of at least one organic compound having a molecular weight of from 500 to 10,000, and containing at least two isocyanate-reactive hydroxyl groups, b2) from about 5 to 30% by weight, based on the total weight of component B) and component C), of at least one organic diol having a molecular weight of from about 62 to 500, and b3) from about 0 to 20% by weight, based on the total weight of component B) and component C), of at least one aminoalcohol having a molecular weight of from about 61 to 500, in the presence of C) from 0.2 to 8% by weight, based on the total weight of component B) and component C), of a catalyst mixture comprising:

c1) from 0.1 to 5% by weight, based on the total weight of component B) and component C), of at least one catalyst selected from the group consisting of metal carboxylates, metal halides, ammonium carboxylates, and mixtures thereof, and c2) from at least 0.1 to 3% by weight, based on the total weight of component B) and component C), of at least one tertiary amine catalyst;

wherein said components are processed via the one-shot process at an isocyanate index of 95 to 120, allowing the reaction components to fully react, and removing the molded part from the mold.

2. The process of claim 1 wherein said catalyst mixture is present in an amount of from 1 to 4% by weight, based on the total weight of component B) and component C), and said catalyst mixture comprises:

c1) from 0.9 to 3% by weight, based on the total weight of component B) and component C), of at least one catalyst selected from the group consisting of metal carboxylates, metal halides, ammonium carboxylates, and mixtures thereof, and c2) from 0.1 to 1% by weight, based on the total weight of component B) and component C), of at least one tertiary amine catalyst.

3. The process of claim 1 wherein c1) comprises a tin carboxylate.

4. The process of claim 1, wherein c1) is dibutyltin dilaurate and c2) is bis(dimethylaminopropyl)methylamine).

* * * * *